United States Patent
Rangel et al.

(10) Patent No.: US 8,650,098 B2
(45) Date of Patent: Feb. 11, 2014

(54) METHODS AND SYSTEMS OF MAINTAINING AND MONITORING VEHICLE TRACKING DEVICE INVENTORIES

(75) Inventors: Juan A. Rangel, Chino Hills, CA (US); Gallin Chen, Irvine, CA (US)

(73) Assignee: Calamp Corp., Oxnard, CA (US)

( * ) Notice: Subject to any disclaimer, the term of this patent is extended or adjusted under 35 U.S.C. 154(b) by 769 days.

(21) Appl. No.: 12/366,790

(22) Filed: Feb. 6, 2009
(Under 37 CFR 1.47)

(65) Prior Publication Data
US 2010/0205071 A1    Aug. 12, 2010

(51) Int. Cl.
*G06Q 10/00* (2012.01)
(52) U.S. Cl.
USPC .............................. 705/28; 340/988; 701/408
(58) Field of Classification Search
USPC ..................................................... 705/28–29
See application file for complete search history.

(56) References Cited

U.S. PATENT DOCUMENTS

| | | | |
|---|---|---|---|
| 2003/0009396 A1* | 1/2003 | DeVries et al. | 705/28 |
| 2003/0126103 A1* | 7/2003 | Chen et al. | 706/50 |
| 2004/0230503 A1* | 11/2004 | Lucas | 705/28 |
| 2007/0010940 A1* | 1/2007 | Tan et al. | 701/207 |
| 2007/0262861 A1* | 11/2007 | Anderson et al. | 340/539.13 |
| 2008/0040268 A1* | 2/2008 | Corn | 705/40 |
| 2008/0312978 A1* | 12/2008 | Binney et al. | 705/7 |
| 2009/0189743 A1* | 7/2009 | Abraham et al. | 340/10.42 |
| 2010/0094482 A1* | 4/2010 | Schofield et al. | 701/2 |

OTHER PUBLICATIONS

Kumagai, J., Sensors and sensibility, Jul. 2004, Spectrum, IEEE, vol. 41, Issue:7, 22-26, 28.*

* cited by examiner

*Primary Examiner* — M. Thein
*Assistant Examiner* — Milena Racic
(74) *Attorney, Agent, or Firm* — KPPB LLP

(57) ABSTRACT

Systems and methods of tracking an installer's inventory of vehicle tracking devices performed by the supplier of the devices are provided. Inventory levels of the devices are checked based on activation and/or registration of a tracking device and a subsequent stock-out notification is sent to the installer based on the checked inventory level.

23 Claims, 6 Drawing Sheets

US 8,650,098 B2

METHODS AND SYSTEMS OF MAINTAINING AND MONITORING VEHICLE TRACKING DEVICE INVENTORIES

BACKGROUND

The present invention relates generally to inventory tracking and in particular to tracking inventory based on interaction of a device with a remote system or entity.

The economic concept of supply and demand is easily understood but is often difficult to practically implement. As supply chains become more extensive, the practice is further strained. Inventory systems have been developed that enable monitoring of inventory levels to ensure products are available for purchase. An appropriately configured inventory system can reduce the amount of capital a business has tied up in inventory and ensure that sufficient inventory is on hand for order fulfillment. Typical inventory management systems involve tracking products as they ordered into inventory are sold out of inventory.

A particularly difficult circumstance arises when inventory is not tracked by a retailer. The retailer can discover inventories are low and request immediate shipment from a supplier. The inability of a supplier to supply either the requested volume or requested delivery date can be damaging to the relationship between the supplier and the retailer. The problem is most acute when the retailer is not a traditional customer, such as a retailer that sells a product as part of another product sale. An example of a non-traditional retailer is an installer of vehicle tracking devices. Vehicle tracking devices are often installed in rental vehicles and vehicles that are sold to vehicle operators that have financed the purchase of the vehicle. The vehicle tracking device allows a vehicle to be located on demand and, in many instances, can disable the vehicle. The installer typically sells vehicles and often installs the tracking device, for example, to lower the risk of the loan given to the vehicle operator. The installer's primary concern is the sale of a vehicle and, therefore, installer's often have little regard for their inventory of vehicle tracking devices. It has thus been a concern that tracking devices will not be on hand for specific required conditions. Also, due to an expedited or limited time frame, not having tracking device in inventory or the inability of a supplier to provide requested tracking devices to an installer in a timely manner can result in the loss of a sale of a tracking device or a vehicle due to a vehicle operator being unwilling to wait until a tracking device is available for installation to take possession of the vehicle.

SUMMARY

Methods and systems of ensuring adequate levels of physical inventory of a vehicle tracking devices are provided.

In one embodiment, a method of tracking an inventory of tracking devices comprises registering a tracking device by an installer with a server; verifying an inventory of tracking devices of the installer by a supplier through the server; and notifying the installer of a low inventory via an electronic message initiated by the server when a set threshold is reached or exceeded. The supplier is different and remote from the installer.

In another embodiment, a vehicle tracking device inventory tracking system comprises a vehicle tracking device associated with an installer, a server in electronic communication with the vehicle tracking device and a client processor accessible by the installer. The client processor is in network communication with the server to receive electronic communications from the server. At least one of the electronic communications is a notification message of a low inventory status of the vehicle tracking devices associated with the installer.

In yet another embodiment, a method of tracking an inventory of vehicle tracking devices comprises supplying power to a vehicle tracking device by an installer; transmitting location data of the vehicle tracking device to a server; updating an inventory level of vehicle tracking devices of the installer by the server when the transmitted location data does not correspond to a set location data; and transmitting an inventory message to a client processor of the installer by the server when a set threshold is reached or exceeded based on the updated inventory level.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DETAILED DESCRIPTION

Systems and methods are described in which a supplier of devices, which automatically registers with a registration server via a wireless communication link upon registration, tracks an installer's physical inventory of devices based upon devices supplied and information concerning number of device registrations received from the registration server. In many systems, the process of tracking inventory involves initiating a sales system to advise the installer or retailer when its inventory of devices is low. The installer typically does not provide any sales or inventory information to the supplier to assist in the supplier's efforts to track the installer's inventory. In many instances, the supplier tracks the inventory of a large number of installers and manages its own inventory based upon the tracked inventories and installation rates of the installers.

A retailer or installer purchases a vehicle tracking device from a manufacturer/supplier. At the point of sale, neither the installer nor the supplier tracks the installer's inventory of vehicle tracking devices. In particular, the installer and/or supplier do not verify or investigate if the installer's inventory of vehicle tracking devices is low.

The installer typically does not monitor the physical inventory of the vehicle tracking devices. Additionally, at best, the responsibility to maintain an adequate level of inventory of devices is typically allocated to the owner, office manager or service manager as secondary duties and is thus often not a main focus to the responsible party. In one case, the installer is a used car dealer or rental car facility in which a vehicle tracking device is installed in the vehicle ultimately to be sold and/or rented. The installer may or may not install a tracking device in every vehicle sold/rented. In some cases, for example, the installer requires that a vehicle tracking device be installed in a collateralized asset vehicle. At this required condition a vehicle tracking device needs to be available for installation or already installed on a vehicle to allow the vehicle to be sold/rented to a vehicle operator. Also, until the vehicle is sold or rented to a vehicle operator, the tracking device may also be removed and placed in another vehicle requiring the tracking device.

The tracking device contains proprietary technology and is typically hidden from the vehicle operator. The device is also hidden to prevent removal of the device from the vehicle. In a particular case, the vehicle operator is unaware of the device being installed on the vehicle. Therefore, the vehicle operator does not purchase the tracking device, is not aware of the device being installed, and/or request purchase or installation of the tracking device.

Figure 1:
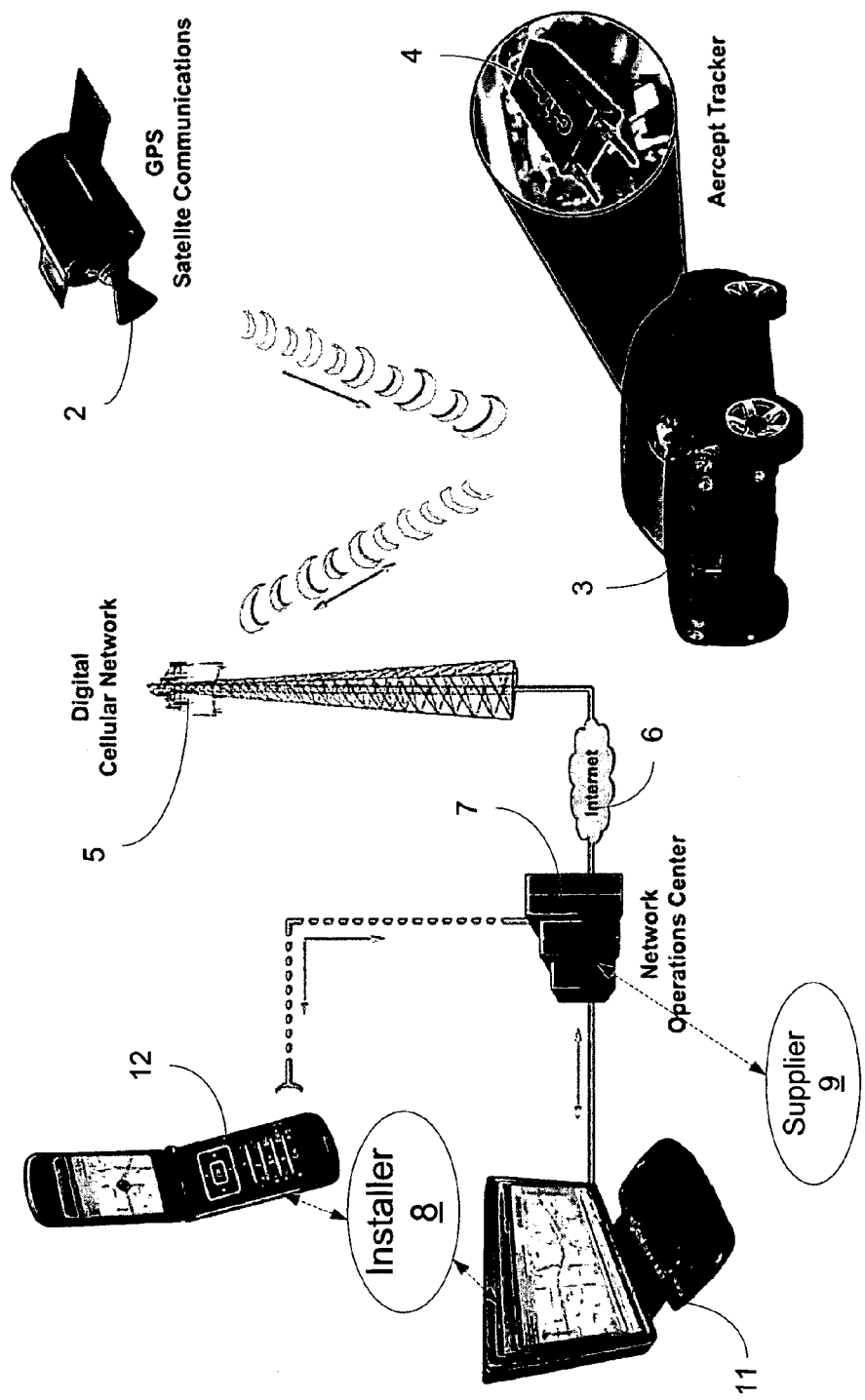
FIG. 1 is a semi-schematic network diagram illustrating a vehicle tracking system in accordance with various embodiments of the invention.

Turning now to the drawings, in FIG. 1, an installer, e.g., a car dealer, installs a vehicle tracking device 4 on a vehicle 3. After installation, the installer supplies power to the device. Upon power-up, the device proceeds to activate in which the tracking device acquires GPS signals from satellites 2 and communicates with a wireless network 5. In one embodiment, the vehicle tracking device includes a GPS receiver that acquires satellite communications to obtain the device's GPS position. The GPS indicator on the device, e.g., a yellow status LED lights up and remains solid to indicate a GPS lock. If the GPS receiver does not have a location lock within a specific period of time, e.g., fifteen minutes, the antenna location and placement or positioning of the device is checked. Afterwards, the GPS acquisition is repeated.

The vehicle tracking device in one embodiment also includes a wireless communicator that registers the device via the wireless network 5, e.g., a cellular network, and/or via the internet 6. A registration indicator, e.g., an orange status LED lights up as solid confirming that the registration was successful. If registration is unsuccessful, the device registration is repeated. In various embodiments, the vehicle tracking device 4 transmits a registration request to an operation center 7. The request in one embodiment at least contains the serial number of the vehicle tracking device being registered or activated.

It should be noted that device registration and GPS acquisition is utilized by the installer and others to track the geographical location of the car. For example, an installer may access the operation center via a web interface and identify a vehicle and/or the tracking device on the vehicle in which the operation center provides the geographical location of the vehicle. Graphical or GPS coordinates in one embodiment are provided to the installer to facilitate identifying the location of the vehicle. In one embodiment, the installer is also able to send commands to the tracking device, for example, send an ignition disable command to prevent further operation of the vehicle.

The supplier also has access to the operation center and thus through this access is passed the device activation or registration request and/or receives a notification of the device's activation. At this point, in one embodiment, the supplier accesses the associated installer's records to identify the installer's inventory level of vehicle tracking devices. Thus, with the device having to perform these handshaking actions to operate the device, the supplier is provided the opportunity to receive and the installer to provide the information used to monitor the installer's device inventory levels.

It should also be noted that the power-up communication and GPS acquisition can be utilized by the supplier and others to track the geographical location of the car. Utilizing the tracked location, the supplier accesses the associated installer's records to identify the installer's inventory level of vehicle tracking devices. In one embodiment, a power-up message is sent to an operation center server. The power-up message provides location data identifying the location of the powered up tracking device. The operation center server compares the provided location to a specified location. Based on this comparison, the operation center server identifies that the tracking device is not in the inventory of the supplier and/or the installer. As such, the operation center accesses the associated installer inventory and records the inventory level of the installer. The location data includes but is not limited to latitude, longitudinal and/or altitude data.

In one embodiment, a database or groups of records identifying locations of installers and suppliers that are accessed by the operation center server to correlate the location data from the tracking device to a location stored in the database or records. If the tracking device location data differs from the supplier's location or other specific factory locations, the operation center identifies the device as activated or powered up by the installer and not the supplier. Also, by correlating the tracking device location to an installer's location, the operation center can identify a particular installer and thus a specific installer's inventory. The installer's inventory is thus updated indicating that one less tracking device is available for use by the installer, and the activated device is thus removed or otherwise indicated as removed from the installer's inventory list or records. The inventory list or records are stored in a database accessible by the operation center server.

Through client/installer processors 11, e.g., computers using an application specific module, software or web interface, the operation center server 7 can notify the installer 8 of a low inventory condition. In various other embodiments, through other communication networks or systems, e.g., a text message to an installer's cellular phone 12, an installer can be notified. Also, through these systems, the installer can also communicate with the operation center 7 and/or the supplier directly to update inventory levels, notifications, profiles, make purchase and/or other similar installer/supplier operations. Further details regarding the low inventory condition and installer/supplier interaction is discussed below.

Utilizing a set threshold level, the operation center notifies the installer of a potential inventory depletion. In particular, if the inventory level equals or is below the set threshold level, the installer is provided a warning of the potential low inventory. The set threshold level in one embodiment is determined and set by the installer through a user interface on a client processor. In another embodiment the set threshold level is determined and/or set by the supplier.

The application warning to the installer can take various forms and be transported through various communication systems. In one example, a low inventory message using text, e-mail, interactive voice recording (IVR) or some other similar type of messaging system communicates the warning to the installer. The message may also communicate the inventory level of available devices or other similar types inventory information.

Upon receiving the warning, the installer can place an add-on order to prevent an inventory short. The order may be automatic, e.g., placed by the application when the warning is sent or when the inventory level continues to fall below the set inventory level. The order may also be communicated to the supplier directly telephonically or through another similar messaging system interface directly with the supplier or an application or server of the operations center configured to process such orders. The order may also re-direct the installer to a third-party or other intermediary parties that can process the order thereby allowing the installer to not be bound to the supplier's operation or potential limitations, e.g., business hours.

The proactive notification increases installer satisfaction. Also, ensuring inventory monitoring allows the installer to focus on their business of selling vehicles and/or managing/servicing a fleet of vehicles. The proactive notification also increases the likelihood of retaining and maintaining relationships between the installer/installer and supplier/manufacturer. Additionally, by allowing installers to place an order before it becomes an emergency further enhances such relationships. The ability to direct or drive an installer to an automated or online store or purchasing tool/application also allows the delivery of promotions, marketing incentives, company news and other such information provided by the supplier that is of interest to the installer and potentially increase device orders.

In one embodiment, each tracking device has a unique identifier, such as a serial number. When a tracking device is to be shipped to an installer the serial number is assigned and placed on a product label of the shipped device. The device is also placed into the account of the installer identified by the serial number. In one embodiment, the installer account is stored in a database or similar storage medium accessible by the server and a client processor of the installer. Installers via the client processor can update or add information in the account for the device once the device is installed. For example, a profile for the tracking device may include additional information such as loan, asset, license number and/or installer name to further identify the vehicle in which the device is installed. In one embodiment, when the product label is updated by the installer, a back-end application of the operations center or the client processor monitoring this activity accesses inventory information to determine inventory level of the devices.

Figure 2:
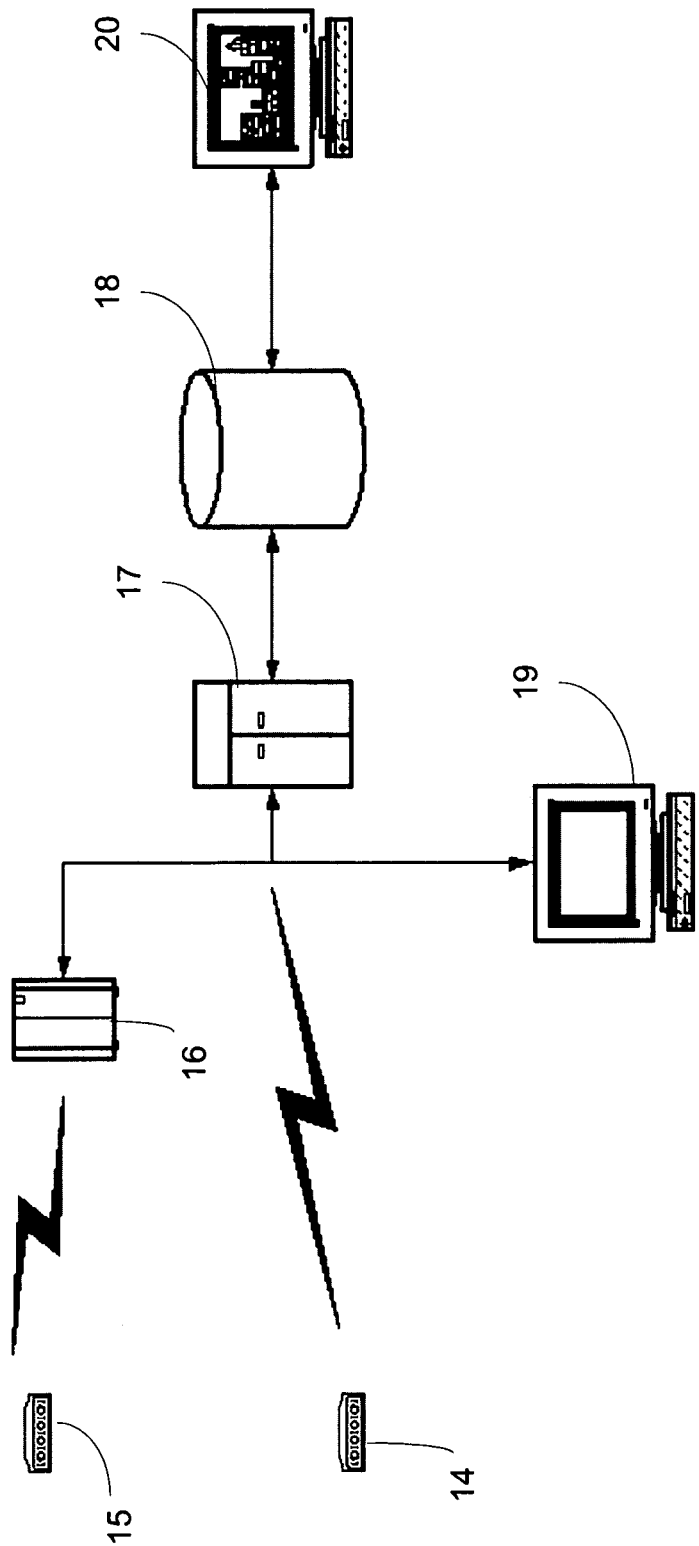
FIG. 2 is a semi-schematic network diagram illustrating a vehicle tracking system in accordance with various embodiments of the invention.

In FIG. 2, one embodiment of the inventory vehicle tracking device system is provided further illustrating various features of the invention. The system illustrated includes a non-IP based vehicle tracking device 15 and an IP based vehicle tracking device 14. One would appreciate that there could be numerous vehicle tracking devices geographically dispersed and associated with numerous vehicles and installers. The non-IP based vehicle tracking device 15 is in electronic communication with a gateway 16 that is in communication with an operation center server 17. The gateway 16 acts as a translator between the non-IP based vehicle tracking device 15 and the server 17 by converting non-IP messages to the IP based server. In one embodiment, a vehicle tracking device manager processor 21 communicates with the gateway and server 17 to ensure proper communication between the units.

The server 17 also accesses and maintains database 18 that includes, but is not limited to, inventory records of vehicle tracking devices correlated to or able to be associated with installer accounts and profiles also stored in the database 18.

Client processor 21 coupled to the database 18 also accesses or queries the database to retrieve vehicle data, e.g., a vehicle location. The vehicle data is provided by the vehicle tracking devices through requests from the server 17 and/or scheduled uploads to the server from the vehicle tracking devices. The server 17 in turn updates the database 18 with the corresponding vehicle data.

Figure 3:
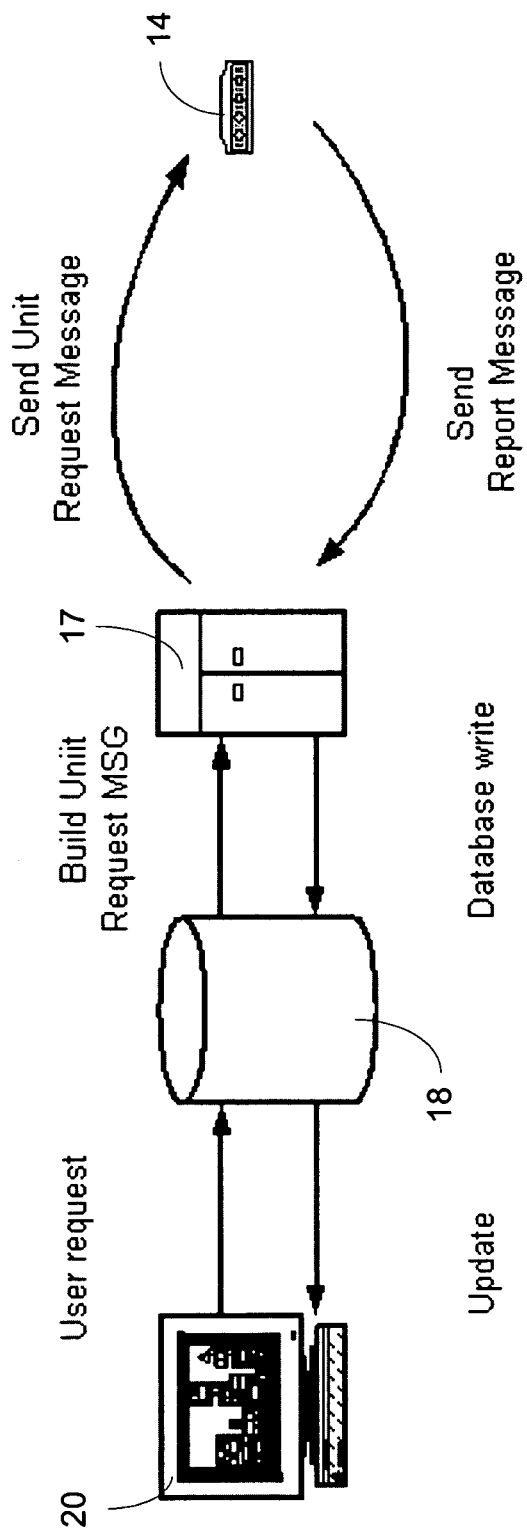
FIG. 3 is a message flow diagram illustrating the interaction between a vehicle tracking device, operations center server and client processor in accordance with various embodiments of the invention.

Requests to the vehicle tracking devices from the client processor 21 in one embodiment are also sent through database 18 as shown for example in FIG. 3. The client processor 21 sends a vehicle tracking device request, e.g., vehicle location, which is stored in the database 18. In one embodiment, the requests are sent directly to the server 17 and/or the database 18 is integrated with the server 17. Utilizing the request from database 18, the server 17 builds a specific tracking device request that is sent to the specific tracking device indicated by the client processor's initial request. In response, the tracking device returns the vehicle data, e.g., the vehicle location, which is received and interpreted by the server. The server 17 writes in the associated data into the database 18 to be retrieved by the client processor 21 to display or otherwise provide the information on the vehicle tracking device of interest to the client processor based on the client processor's initial request. As previously noted, the inventory level of the installer can be provided to the client processor by direct interaction by the client processor 21 and/or the server 17. Thus, the supplier via server 17 and database 18 can recognize the total number as well as a specific vehicle tracking device of the installer in operation. As a result, the supplier can maintain and track each vehicle tracking device associated with each installer and thus maintain inventory records associated with each installer. Based on these records and the set inventory threshold, the server 17 sends electronic messages to the client processor 21 via the database 18 or directly thereby notifying the installer of a low inventory level of tracking devices when the condition arises.

Figure 4:
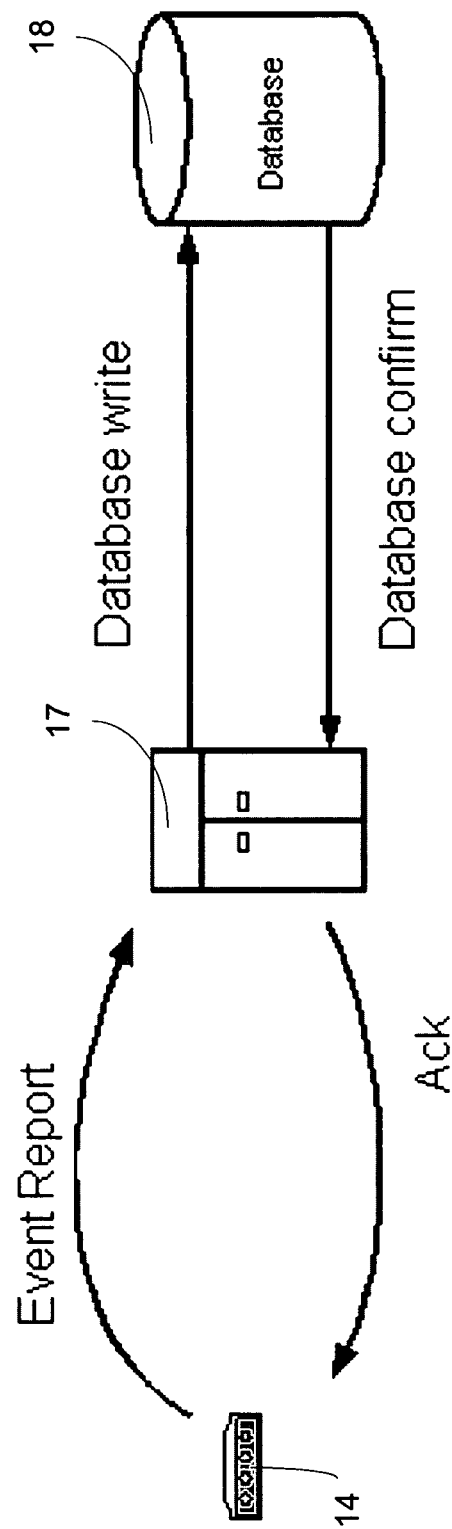
FIG. 4 is a message flow diagram illustrating the interaction between a vehicle tracking device and the operations center server in accordance with various embodiments of the invention.

As shown in FIG. 4, the tracking device is also configured to create and send vehicle data and/or reports to the server 17 without interaction or at the request of the server 17 and/or client processor 21. The server 17 receives, interprets and updates the database 18 based on the received data from the tracking device. Upon confirmation of the update to the database, the server 17 transmits an acknowledgement to the tracking device indicating the receipt of the data and the update to the database. As noted previously, the data provided by the tracking device without interaction by the server 17 and/or client processor 21 allows the server 17 to track and maintain inventory levels of an installer associated with the particular tracking device. Therefore, without delay and/or further external interaction, the server 17 can update and compare the installer's tracking device inventory level to the set threshold level. As a result, when a low inventory condition occurs, the server 17 can alert the installer via the client processor 21 of the updated and, in particular, the reduced installer's inventory level.

Figure 5:
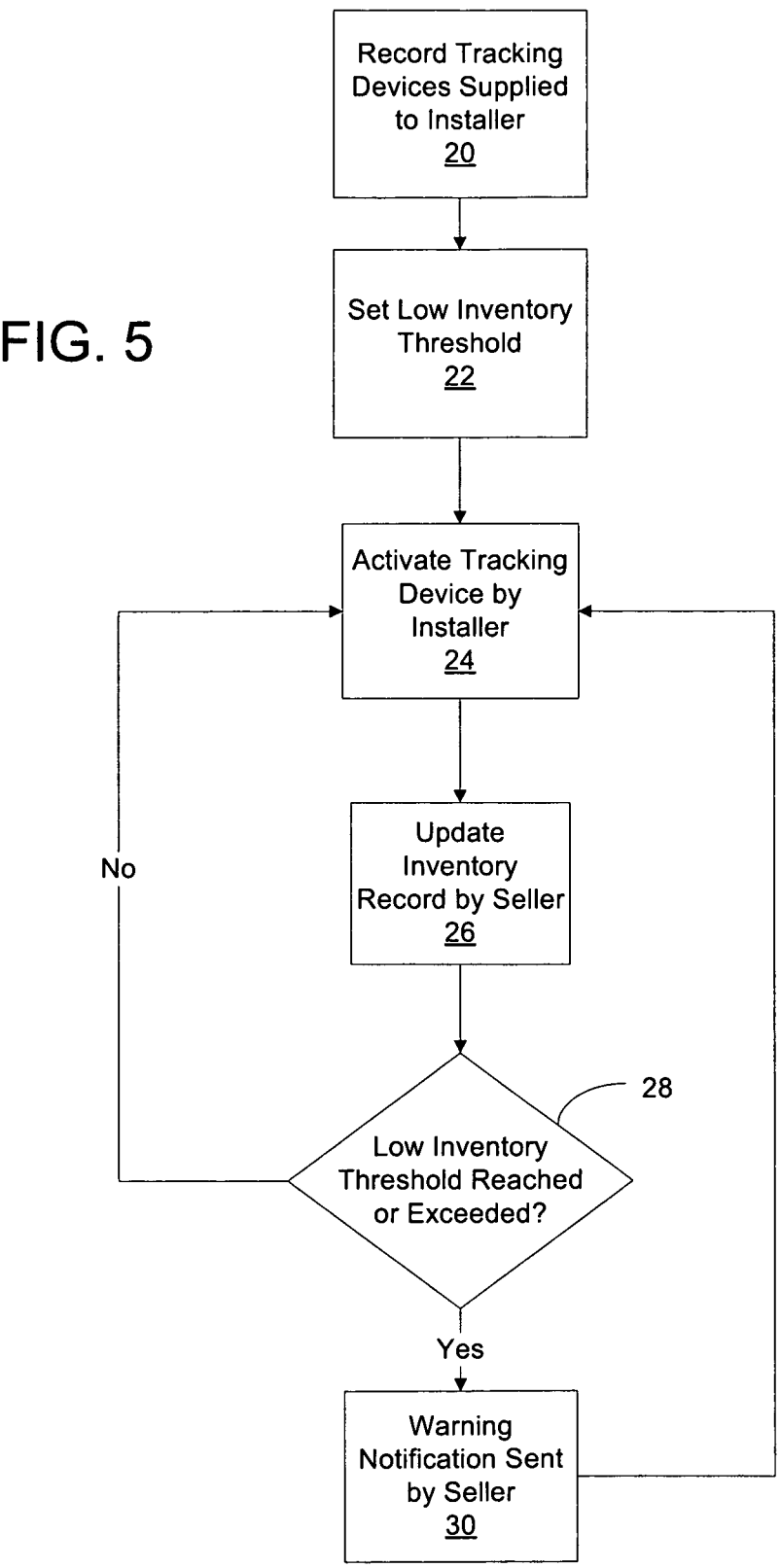
FIG. 5 is a flowchart illustrating tracking an inventory level of a vehicle tracking device in accordance with various embodiments of the invention.

Referring now to FIG. 5, one embodiment of a process of monitoring the tracking devices inventory is shown. The tracking devices supplied to the installer are recorded by the supplier (20). A low inventory threshold level is set (22). The installer registers a tracking device (24). Upon power-up, activation and/or registration of the tracking device, the supplier updates the record (26) and verifies if the Low inventory threshold level has been met or exceeded (28). A warning notification is communicated to the installer if the threshold level has been met or exceeded (30). Optionally, an order may be placed to the supplier to resupply the installer and/or the supplier may be directed to a purchasing site or provided re-ordering information. The re-order information in one embodiment provides a fully filled-in order form only requiring confirmation from the installer but still fully editable by the installer to update quantities, shipping preferences, payment details and the like. The process continues until terminated by the supplier and/or installer. If the device inventory level reaches a zero or near-zero threshold, the installer can optionally receive a further warning or an alert message to emphasize the potential occurrence of an emergency situation. The zero or near-zero threshold is a quantity less than the low inventory threshold level but at least or more than zero.

Figure 6:
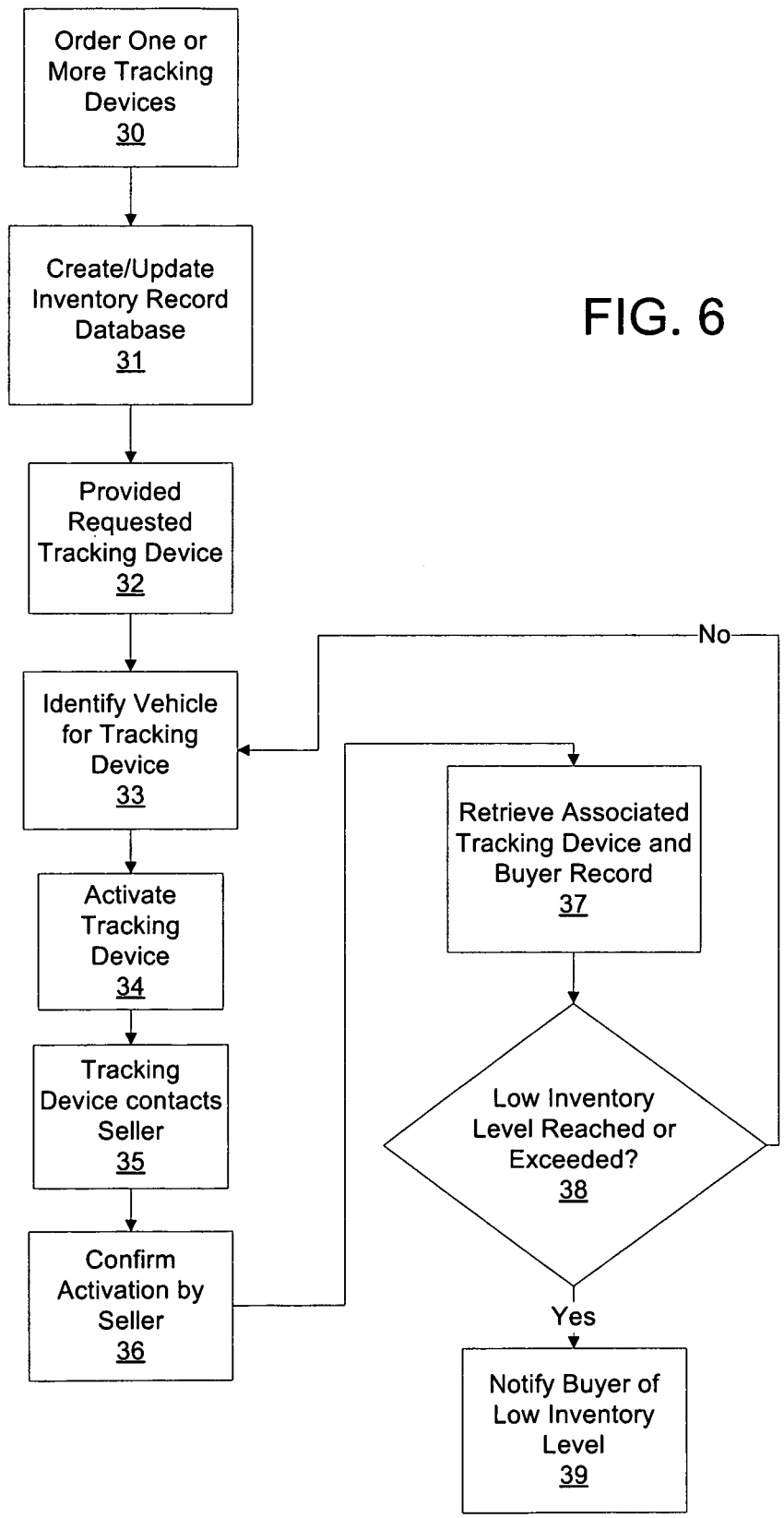
FIG. 6 is a flowchart illustrating tracking an inventory level of a vehicle tracking device in accordance with various embodiments of the invention.

In FIG. 6, one embodiment of an inventory monitoring process is provided. An installer/retailer initially orders one or more vehicle tracking devices (30). A manufacturer/supplier of a vehicle tracking device records an inventory record for a particular installer within an installer inventory database (31). The inventory record in one embodiment includes a unique identifier, e.g., a serial number of the vehicle tracking device; an installer identifier, e.g., installer contact information; and a device quantity. The supplier provides the requested vehicle tracking devices to the installer (32). The installer identifies one or more vehicles in which to install the device (33) and registers the device (34). Upon power-up, activation and/or registration, the vehicle tracking device contacts the supplier (35). In one embodiment, the device information is updated or registers with the supplier, the supplier is thus notified of the registration. The installer receives confirmation from the supplier that the device is registered (36).

The supplier queries the database and retrieves the associated installer record (37). From the record, the supplier extracts the installer's device inventory level and compares the result to a set low inventory level (38). If the level has been met or passed, the supplier notifies the installer or a designated purchasing agent for the installer of the low inventory level (39). The installer in one embodiment is provided the option to order more. In one embodiment, a second or additional inventory levels may be set to vary the levels of warnings and the conditions that triggers them. The process continues until terminated by the installer or supplier. In various embodiments, using the installer's records, the supplier may have such granularity to identify a particular device and determine if the device has been activated or not.

In one embodiment, the tracking device can be re-used. For example, upon or near the final payments on the vehicle loan, ownership transfer of the vehicle, or a change in credit status of a vehicle operator, the installer uninstalls the tracking device to be potentially re-used in another vehicle. It should be noted that the tracking device is typically owned by the installer or a lender and not a vehicle operator. Once uninstalled, the operation center that typically gets periodic location data from the device updates the associated installer record to indicate that tracking device is a new addition to the installer's inventory level. A power-off message or re-stock message could also be delivered by the installer through the tracking device during or after the un-installation of the tracking device from the vehicle. Likewise, additionally or alternatively, a positive un-installation confirmation message or inventory update from the installer via accessing the operation center server can also update or confirm the update to the installer's inventory records. The messages in one embodiment include identifiers to indicate the message type allowing the operation center to filter or otherwise recognize and specifically process the messages.

In one embodiment, a financial entity, e.g., a lender, owns and/or monitors the tracking devices. As such, a lender may re-use the tracking device by directing installer or otherwise uninstalling the tracking device from the vehicle. The lender in one embodiment can set conditions such as loan status or credit status to initiate re-use of the tracking device.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of tracking an inventory of vehicle tracking devices, comprising:
   registering a tracking device with a supplier using the tracking device by transmitting an electronic installation message using the tracking device to an inventory tracking server when the inventory tracking device is installed, wherein:
   the tracking device was issued to an installer by the supplier and the supplier is different and remote from the installer;
   the electronic installation message comprises a unique identifier, assigned by the supplier, for the vehicle tracking device transmitting the electronic installation message; and
   the supplier maintains an inventory tracking server comprising at least one installer account, where an installer account comprises at least one unique identifier for vehicle tracking devices assigned to a particular installer by the supplier;
   verifying an inventory of tracking devices of the installer by the supplier based on the electronic installation message using the inventory tracking server, where verifying an inventory of tracking devices comprises identifying the installer's level of vehicle tracking devices based on the received serial numbers and the vehicle tracking devices assigned to the installer account associated with the installer by the supplier; and
   notifying the installer of a low inventory via an electronic message initiated by the supplier using the inventory tracking server when a set threshold is reached or exceeded.

2. The method of claim 1 further comprising installing the tracking device by the installer and supplying the tracking device by the supplier.

3. The method of claim 2 further comprising installing the tracking device into a vehicle and purchasing the vehicle by a vehicle operator being different from the installer and the supplier.

4. The method of claim 3 further comprising purchasing the installed tracking device by the vehicle operator.

5. The method of claim 2 further comprising installing the tracking device into a vehicle and renting the vehicle by a vehicle operator being different from the installer and the supplier.

6. The method of claim 1 wherein registering the tracking device further comprises supplying power to the tracking device and transmitting an electronic power-up communication to the inventory tracking server by the tracking device, upon receiving the supplied power.

7. The method of claim 1 wherein registering the tracking device further comprises acquiring a global positioning satellite signal.

8. The method of claim 1 wherein transmitting an electronic installation message to the inventory tracking server is performed using a cellular network.

9. The method of claim 8 wherein verifying the inventory of tracking devices of the installer is performed after registration with the inventory tracking server.

10. The method of claim 1 further comprising associating a tracking device with a vehicle and wherein registering the tracking device further comprises profiling the tracking device by the installer to identify the tracking device relative to the associated vehicle.

11. The method of claim 1 wherein verifying the inventory of tracking devices of the installer further comprises querying records of a database, correlating a record from the queried records to the registered tracking device and the installer, retrieving an inventory level from the correlated record, comparing the retrieved inventory level to the set threshold.

12. The method of claim 11 wherein the inventory of tracking devices of the installer is verified after registration of the tracking device.

13. The method of claim 1 further comprising setting the set threshold by the installer or the supplier.

14. The method of claim 1 wherein notifying the installer further comprises sending an electronic message from the inventory tracking server to a client processor of the installer.

15. The method of claim 1 wherein notifying the installer further comprises sending an electronic message from the inventory tracking server to a client processor of the supplier, the supplier sending an electronic message to a client processor of the installer.

16. The method of claim 1, further comprising:
transmitting an electronic uninstallation message to the inventory tracking server using the tracking device, where the electronic uninstallation message indicates that the tracking device has been recovered by the installer; and
updating the inventory of tracking devices held by the installer based on the electronic uninstallation message using the inventory tracking server, where the updated inventory of tracking devices indicates that the installer has the tracking device in the installer's inventory.

17. A vehicle tracking device inventory tracking system comprising:
a vehicle tracking device associated with an installer, where the vehicle tracking device is issued to the installer by a supplier;
a server in electronic communication with the vehicle tracking device associated with the supplier, where:
the supplier is different and remote from the installer;
the server comprises at least one an installer account; and
an installer account comprises at least one unique identifier for vehicle tracking devices assigned to a particular installer by the supplier; and
a client processor accessible by the installer and in network communication with the server to receive electronic communications from the server, at least one of the electronic communications being a notification message from the supplier of a low inventory status of the vehicle tracking devices associated with the installer;
wherein the vehicle tracking device is configured to transmit an electronic installation message to the server associated with the supplier when the vehicle tracking device is installed by the installer, where the electronic installation message comprises a unique identifier, assigned by the supplier, for the vehicle tracking device transmitting the electronic installation message;
wherein the server is configured to verify the inventory status of the vehicle tracking devices for the installer account associated with the installer based on the electronic installation message, where verifying an inventory of tracking devices comprises identifying the installer's level of vehicle tracking devices based on the received serial numbers and the vehicle tracking devices assigned to the installer account associated with the installer by the supplier; and
wherein the server is configured to notify the client processor of a low inventory via an electronic message initiated by the supplier using the inventory tracking server when a set threshold is reached or exceeded.

18. The system of claim 17 wherein the server is controlled by a supplier, the supplier being different from the installer and arranged to supply vehicle tracking devices to the installer.

19. The system of claim 18 wherein the vehicle tracking device is registered by an installer and the registration is verified by the server.

20. The system of claim 19 wherein the server stores vehicle tracking device inventory information including a vehicle tracking device inventory level associated with the installer and the server compares the vehicle tracking device inventory level relative to a set threshold limit after verifying registration of tracking device.

21. The system of claim 18 further comprising a vehicle tracking device database coupled to the server and including records on vehicle tracking devices of the installer.

22. The system of claim 21 wherein the client processor communicates to the server via the vehicle tracking device database.

23. The system of claim 17, wherein:
the vehicle tracking device is configured to transmit an electronic uninstallation message upon removal of the vehicle tracking device by the installer; and
the inventory status of the installer with the supplier is updated to reflect the recovered vehicle tracking device based on the electronic uninstallation message.

* * * * *

UNITED STATES PATENT AND TRADEMARK OFFICE
CERTIFICATE OF CORRECTION

PATENT NO.        : 8,650,098 B2                                    Page 1 of 1
APPLICATION NO.   : 12/366790
DATED             : February 11, 2014
INVENTOR(S)       : Juan Rangel It is certified that error appears in the above-identified patent and that said Letters Patent is hereby corrected as shown below:

In claim 11, (Column 9, line 13) add "and" after 'record,'

Signed and Sealed this
Seventeenth Day of November, 2015

Michelle K. Lee
*Director of the United States Patent and Trademark Office*